3,478,096
SEC.-ALKYL- OR CYCLOALKYL-ALKOXY-
ALKYLAMINES
Henryk A. Cyba, Evanston, Ill., assignor to Universal Oil
 Products Company, Des Plaines, Ill., a corporation of
 Delaware
No Drawing. Filed Apr. 18, 1966, Ser. No. 543,008
Int. Cl. C07c 91/06, 93/12, 93/04
U.S. Cl. 260—563               5 Claims

ABSTRACT OF THE DISCLOSURE

N-substituted alkoxylalkylamines having the formula

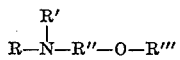

where R is sec-alkyl or cycloalkyl, R' is hydrogen, sec-alkyl or cycloalkyl, R" is alkylene, and R'" is alkyl or hydroxyalkyl. The compounds are useful as additives for hydrocarbon oils and plastics.

---

This invention relates to N-substituted-alkoxyalkyl-amines which are believed to be novel compositions of matter and which are effective compounds for various uses.

The N-substituted alkoxyalkylamines of the present invention are of the following structure

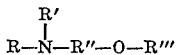

where R is sec-alkyl or cycloalkyl, R' is hydrogen, sec-alkyl or cycloalkyl, R" is alkylene, and R'" is alkyl or hydroxyalkyl.

In a particularly preferred embodiment, R is sec-alkyl of from 3 to about 20 carbon atoms or cyclohexyl, R' is hydrogen, sec-alkyl of from 3 to about 20 carbon atoms or cyclohexyl, R" is alkylene of from 2 to about 10 carbon atoms and R'" is alkyl of from 1 to about 10 carbon atoms or hydroxyalkyl of from 1 to about 10 carbon atoms.

Illustrative compounds in which R" contains 2 carbon atoms include

N-isopropyl-2-methoxyethylamine,
N-sec-butyl-2-methoxyethylamine,
N-sec-pentyl-2-methoxyethyl-amine,
N-sec-hexyl-2-methoxyethylamine,
N-sec-heptyl-2-methoxyethylamine,
N-sec-octyl-2-methoxyethylamine,
N-sec-nonyl-2-methoxyethylamine,
N-sec-decyl-2-methoxyethylamine,
N-sec-undecyl-2-methoxyethylamine,
N-sec-dodecyl-2-methoxyethylamine,
N-sec-tridecyl-2-methoxyethylamine,
N-sec-tetradecyl-2-methoxyethylamine,
N-sec-pentadecyl-2-methoxyethylamine,
N-sec-hexadecylmethoxyethylamine,
N-sec-heptadecyl-2-methoxyethylamine,
N-sec-octadecyl-methoxyethylamine,
N-sec-nonadecyl-2-methoxyethylamine,
N-sec-eicosyl-methoxyethylamine, etc.;
N,N-di-isopropyl-2-methoxyethylamine,
N,N-di-sec-butyl-2-methoxyethylamine,
N,N-di-sec-pentyl-2-methoxyethylamine,
N,N-di-sec-hexyl-2-methoxyethylamine,
N,N-di-sec-heptyl-2-methoxyethylamine,
N,N-di-sec-octyl-methoxyethylamine,
N,N-di-sec-nonyl-2-methoxyethylamine,
N,N,di-sec-decyl-2-methoxyethylamine, etc.;
N-cyclopropyl-2-methoxyethylamine,
N-cyclobutyl-2-methoxyethylamine,
N-cyclopentyl-2-methoxyethylamine,
N-cyclohexyl-2-methoxyethylamine,
N-cycloheptyl-2-methoxyethylamine,
N-cyclooctyl-2-methoxyethylamine, etc.;
N,N-dicyclopropyl-2-methoxyethylamine,
N,N-dicyclobutyl-2-methoxyethylamine,
N,N-dicyclopentyl-2-methoxyethylamine,
N,N-dicyclohexyl-2-methoxyethylamine,
N,N-dicycloheptyl-2-methoxyethylamine,
N,N-dicyclooctyl-2-methoxyethylamine, etc., as well as N,N-di-sec-alkyl-2-methoxyethylamines in which the sec-alkyl groups are different, N,N-di-cyclo-alkyl-2-methoxyethylamines in which the cycloalkyl groups are different, and N,N-di-substituted 2-methoxy-ethylamines in which one substituent is sec-alkyl and the other substituent is cycloalkyl, the sec-alkyl and cycloalkyl groups being selected from those hereinbefore set forth.

The specific compounds set forth above comprise those in which R'" is an alkyl of one carbon atom. When R'" contains a larger number of carbon atoms, the correspondingly N-substituted-alkoxyethylamines will be N-substituted-2-ethoxyethylamine,
N-substituted-2-propoxyethylamine,
N-substituted-2-butoxyethylamine,
N-substituted-2-pentoxyethylamine,
N-substituted-2-hexoxyethylamine,
N-substituted-2-heptoxyethylamine,
N-substituted-2-octoxyethylamine,
N-substituted-2-nonoxyethylamine,
N-substituted-2-decoxyethylamine, etc.

While R'" preferably is an alkyl group, in another embodiment R'" is a cycloalkyl group. Illustrated compounds in this embodiment include N-substituted-cyclopentoxyethylamine, N-substituted cyclohexoxyethylamine, N - substituted - cycloheptoxyethylamine, N-substituted-cyclooctylethylamine, etc.

Similarly, when R" contains more than 2 carbon atoms, the compound will comprise the correspondingly N-substituted alkoxy-2-propylamine, 3-propylamine, 2-butyl-amine, 3 - butylamine, 4 - butylamine, 2 - pentylamine, 3-pentylamine, 4-pentylamine, 5-pentylamine, 2-hexyl-amine 3-hexylamine, 4-hexylamine, 5-hexylamine, 6-hex-ylamine, etc.

It is understood that, when R" and/or R'" is an alkyl group of 3 or more carbon atoms, the alkyl group may be of straight or branched chain, and also that R" and/or R'" may be of primary, secondary or tertiary alkyl configuration. Illustrative compounds in the last mentioned embodiment include N-substituted-isopropoxyalkylamine, N-substituted-tert-butoxyalkylamine, N - substituted-tert-pentoxyalkylamine, N-substituted-tert-hexoxyalkylamine, etc.

When R'" is a hydroxyalkyl, the hydroxylalkyl group preferably contains from 1 to about 10 carbon atoms and thus this group will be selected from hydroxymethyl, hydroxyethyl, hydroxypropyl, hydroxybutyl, hydroxypen-tyl, hydroxyhexyl, hydroxyheptyl, hydroxyoctyl, hydroxy-nonyl and hydroxydecyl. Illustrating but not limiting examples of compounds in this embodiment include N-sec-alkyl-hydroxymethoxyalkylamine, N,N-di-sec-alkyl-hydroxymethoxyalkylamine, N-cycloalkylhydroxymethox-yalkylamine, N,N - dicycloalkyl hydroxymethoxyalkyl-amine and corresponding compounds in which the alkoxy group contains from 2 to about 10 carbon atoms.

The novel compounds of the present invention may be prepared in any suitable manner. In a preferred method, the alkoxyalkylamine is subjected to reductive alkylation with a ketone in the presence of hydrogen and a reductive alkylation catalyst. The ketone will be selected to produce the desired substitution or substitutions on the nitrogen atom. Illustrative but not limiting ketones include acetone, methylethylketone, methylpropylketone, methylbutylketone and corresponding methylalkyl ketones in which the alkyl group contains from 5 to about 18 carbon atoms, diethylketone, ethylpropylketone, ethylbutylketone, ethylpentylketone and corresponding ethylalkylketones in which the alkyl group contains from 6 to about 17 carbon atoms, dipropylketone, propylbutylketone, propylpentylketone, propylhexylketone and corresponding propylalkylketones in which the alkyl group contains from 7 to 16 carbon atoms. Other higher molecular weight ketones may be used. It is understood that a mixture of these ketones may be employed.

When the substituent is a cycloalkyl group, cycloalkyl ketones are used and include cyclopropanone, cyclobutanone, cyclopentanone, cyclohexanone, cycloheptanone, cyclooctanone, etc. Here again it is understood that a mixture of cycloalkylketones may be used, as well as a mixture of the alkyl and cycloalkylketones.

The reductive alkylation is effected in any suitable manner and either in a single or multiple step operation. In a particularly preferred method, the reductive alkylation is effected in a single step employing a hydrogen pressure of from about 100 to 3,000 p.s.i.g. or more. Any suitable catalyst is employed including those containing nickel, cobalt, platinum, palladium, molybdenum, etc. or a mixture of these or of the oxides of chromium, copper and barium, preferably composited with a suitable support. A particularly preferred catalyst comprises a composite of platinum and alumina, containing from about 0.1 to about 2% by weight of platinum, which may or may not contain chlorine and/or fluorine in a total halogen content of from about 0.01% to about 5% by weight. When using the platinum catalyst, the temperature generally will be in the range of about 200° to about 500° F. In a preferred continuous operation the catalyst is deposited as a fixed bed in a reaction zone and the reactants, at the desired temperature and pressure, are passed therethrough, in either upward or downward flow. Generally, an excess of ketone to alkoxyalkylamine is used and this excess may range from 1.5 to 20 mols of ketone per mol of alkoxyalkylamine.

The alkoxyalkylamine may be obtained from any suitable source or prepared in any suitable manner. Alkoxyethylamine may be prepared by reacting hydroxyacetonitrile with a suitable etherifying agent, including dialkyl sulfates, alkyl halides and in some cases alcohols and ethers, followed by reduction. Thus, methoxyethylamine may be prepared by reacting hydroxyacetonitrile with dimethylsulfate, methyliodide, methylbromide or methylchloride, in the presence of caustic, or with methylalcohol or dimethylether under high temperature (300 to 450° F.) and high pressure (100–2000 p.s.i.g.). The mol ratio of hydroxyacetonitrile to etherifying agent will be within the range of 0.8:1 to about 1.25:1. Similarly, alkoxypropylamine is prepared by the etherification of hydroxyacrylonitrile, followed by reduction. The reduction is effected in any suitable manner by reacting with hydrogen in the presence of a hydrogenation catalyst including nickel, chromia, molybdenum, platinum, palladium, etc., or mixtures thereof, preferably composited with a suitable support. The hydrogenation is effected at a temperature of from about 100° F. to 500° F. and a pressure of from 100 to about 3000 p.s.i.g. Other alkoxyalkylamines are prepared in the same general manner as set forth above or in any other suitable manner.

The preparation of the novel compounds of the present invention may be effected in the presence of a suitable solvent in any stage of preparation. Particularly preferred solvents comprise hydrocarbons and more particulary aromatic hydrocarbon including benzene, toluene, xylene, ethylbenzene, cumene, etc. or mixtures thereof, paraffin hydrocarbon including particularly pentane, hexane, heptane, octane, etc. or mixtures thereof, or mixtures of paraffin and aromatic hydrocarbons, as well as mixtures such as gasoline, naphtha, etc. In some cases the solvent may comprise an alcohol including methanol, ethanol, propanol, butanol, etc.

In one embodiment the novel compound of the present invention may be recovered in admixture with the solvent and used in this manner. In another embodiment the solvent may be removed in any suitable manner and particularly by vacuum distillation.

The novel compounds of the present invention will have varied utility. Some of these compounds are of especially high potency as additives to fuel oil and serve to prevent sediment formation therein. These compounds also may be used for a similar purpose in other hydrocarbon distillates including gasoline, naphtha, kerosene, diesel fuel, marine fuel, burner oil, range oil, lubricating oil, etc.

In still another embodiment the compound of the present invention may be used as an additive in resins or plastics including, for example, polyolefins and particularly polyethylene, polypropylene, polybutylene, and mixed polymers of ethylene, propylene and/or butylene. Other plastics include polystyrene, polyvinylchloride, phenol-formaldehyde resins, urea-formaldehyde resins, melamine-formaldehyde resins, acryloid plastics, polyester resins, etc.

In another embodiment the compound of the present invention may be used as a curing agent for various resins and plastics including particularly polyurethanes and polyurethane foams. The polyurethanes generally are prepared by the reaction of an isocyanate with a polyol and/or polyester, as, for example, by the reaction of toluene-2,4-diisocyanate with polytetramethyleneether glycol, alone or in combination with other additional diols and/or other diisocyanates. In still another embodiment the compound is used as a curing agent for epoxy resins. The epoxy resins are formed by the reaction of a 1,2-epoxy compound and a dihydric phenol or polyalcohol as, for example, the reaction of an epoxy chlorohydrin with bisphenol-A (2,2-bis-(4-hydroxyphenyl)-propane).

The concentration of the compound of the present invention to be employed as an additive will depend upon the particular substrate in which it is to be used. For example, when used as an additive in hydrocarbon distillate and particularly fuel oil to prevent sediment formation, the additive is used in as low a concentration as practical for economic reasons. In some cases, this may range as low as 0.001% by weight and may go as high as 0.05% and even up to 1% by weight of the hydrocarbon distillate. When used in other substrates, the amount generally will be within the range of 0.01% to 5% by weight. When used as a curing agent, a higher concentration generally is incorporated and may range up to about 25% of the resin.

It is understood that the novel compounds of the present invention may be used along with other additives normally incorporated in the substrate. For example, when used in fuel oil, the compound of the present invention may be used along with an antioxidant, which generally will be a phenol, including 2,6-di-tertiarybutyl-4-methylphenol, 2,4-dimethyl-6-tertiarybutylphenol, etc. or an amine, including N,N'-diisopropyl-p-phenylenediamine, N,N'-di-secbutyl-p-phenylenediamine, N,N'-di-sec-octyl-p-phenylenediamine, etc., and/or a metal deactivator, including disalicylal diaminopropane, ethylenediaminetetracedic acid or its alkali metal salt, etc. When used in gasoline, other additives comprise antiknock agent, dye, etc. In addition, the composition may contain detergent and/or dispersing agents. When desired, the novel compound of the present invention may be prepared as a mixture with one or more of these other additives and used in this manner.

The following examples are introduced to illustrate further the novelty and utility of the present invention but not with the intention of unduly limiting the same.

EXAMPLE I

The compound of this example is N-sec-butyl-3-ethoxypropylamine and was prepared by the reductive alkylation of ethoxypropylamine with methylethyl ketone. Specifically, 200 g. of ethoxypropylamine and 240 g. of methylethyl ketone were reductively alkylated at 285° F. under a hydrogen pressure of about 125 atmospheres in the presence of a platinum-alumina catalyst containing 0.3% by weight of platinum. The reaction was effected in a rotating bomb for about 4 hours. After completion of the reaction, the contents were filtered to remove catalyst, and excess ketone was removed by vacuum distillation. N-sec-butyl-3-ethoxypropylamine was recovered as a light colored liquid having a basic nitrogen content of 6.03 meq./g., a mole equivalent weight of 165.7 and a refractive index $n_D^{20}$ of 1.4227. The boiling point at 9 mm. Hg was 66° C. and at 10.2 mm. it was 68.2° C.

EXAMPLE II

The compound of this example is N,N'-dicyclohexyl-3-methoxypropylamine, and was prepared by reductive alkylating 178 g. (2 moles) of 3-methoxypropylamine with 393 g. (4 moles) of cyclohexanone in the presence of a platinum-alumina catalyst, the catalyst being substantially the same as described in Example I. The reduction alkylation was conducted at about 320° F. using a hydrogen pressure of about 100 atmospheres. Following completion of the reaction, the reaction mixture was filtered to remove the catalyst and the filtrate was distilled under water pump vacuum to remove any unreacted cyclohexanone. N,N'-dicyclohexyl-3-methoxypropylamine was recovered as a clear liquid having an index of refraction $n_D^{20}$ of 1.4835, a basic nitrogen of 4.05 meq./g. and a basic equivalent weight of 248, the latter corresponding to the theoretical basic equivalent weight of 247. The non-corrected boiling point was 130° C. at 0.15 mm. Hg.

EXAMPLE III

The compound of this example is N-sec-octyl-2-hydroxyethoxyethylamine. This compound was prepared by the reductive alkylation of 434 g. (2 moles) of 2-(2-hydroxyethoxy)-ethylamine with 381 g. (3 moles) of ethylhexyl ketone. The reductive alkylation was effected at a temperature of about 320° F. and under a hydrogen pressure of about 120 atmospheres in the presence of a platinum-alumina catalyst. The reaction was effected in a rotating bomb for about 5 hours. Following completion of the reaction, the effluent products were filtered to remove the catalyst. N-sec-octyl-2-hydroxyethoxylamine was recovered as a light colored liquid having an index of refraction $n_D^{20}$ of 1.4543, a basic nitrogen content of 4.65 meq./g. and a molecular weight of 215 which corresponds to the theoretical molecular weight of 217. The boiling point was 146° C. at 4.2 mm. Hg and 162° C. at 9.5 mm. Hg.

EXAMPLE IV

As hereinbefore set forth, the compounds of the present invention are of exceptional utility as additives to present sediment formation in fuel oil. In this example the additive was evaluated in different commercial fuel oils by the standard one day fuel oil test. In this test samples of the fuel oil are maintained for 16 hours at 212° F. in an oxygen atmosphere, after which the amount of sediment is determined. It has been found that if the sediment formed in this manner is less than 1.6 mg./100 ml., the oil is usualy considered stable. Also, it has been found that this method correlates very well with the 3-month storage test at 110° F.

The fuel oil used in this example is a light catalytically cracked cycle oil. When a control sample of this oil not containing an inhibitor) was evaluated in the above manner, 15.4 mg./100 ml. of sediment formed.

In contrast, another sample of this oil containing 32 parts by million of N-sec-butyl-3-ethoxypropylamine, prepared as described in Example I, when evaluated in the above manner, formed only 0.4 mg./100 ml. of sediment.

Still another sample was evaluated containing 29 parts per million of N-sec-butyl-3-ethoxypropylamine and 2.88 parts per million of copper deactivator (disalicylal diaminopropane). When evaluated in the same manner, this sample formed only 0.3 mg./100 ml. of sediment.

Another evaluation was made in a different fuel oil. The fuel oil of this example is a commercial No. 2 fuel oil which, when evaluated in the above manner, formed 4.4 mg./100 ml. of sediment. Another sample of this fuel oil containing 23 parts per million of N-sec-butyl-3-ethoxypropylamine and 2.56 parts per million of disalicylal diaminopropane formed only 0.8 mg./100 ml. of sediment when evaluated in the above manner.

EXAMPLE V

N,N-dicyclohexyl-3-methoxypropylamine, prepared as described in Example II, also was evaluated in another sample of the light catalytically cracked cycle oil described in Example IV. The addition of 29 parts per million of N,N-dicyclohexyl-3-methoxypropylamine and 2.88 parts per million of disalicylal diaminopropane reduced the sediment formation from 15.4 to 0.3 mg./100 ml. when evaluated in the same manner as described above.

EXAMPLE VI

N-sec-octyl-2-hydroxyethoxyethylamine, prepared as described in Example III also was evaluated in another sample of the light catalytically cracked cycle oil described in Example IV. A sample of the oil containing 32 parts per million of N-sec-octyl-2-hydroxyethoxyethylamine reduced the sediment formation from 15.4 to 0.8 mg./100 ml. when evaluated in the same manner as described above.

Another sample of the oil containing 29 parts per million of N-sec-octyl-2-hydroxyethoxyethylamine and 2.88 parts per million of disalicylal diaminopropane, when evaluated in the same manner as described above, reduced the sediment formation from 15.4 to 0.8 mg./100 ml.

EXAMPLE VII

A number of evaluations were made in a long term storage test in which samples of the fuel oil are stored in the dark for three months at 110° F. in vented Pyrex flasks, after which the sediment formation is determined.

The oil used in this example is the No. 2 fuel oil which formed 4.4 mg./100 ml. of sediment in the one day stability test. When a sample of this oil was stored for three months, it formed 1.4 mg./100 ml. of sediment. However, another sample of this No. 2 fuel oil containing 23 parts per million of N-sec-butyl-3-ethoxypropylamine, prepared as described in Example I, and 2.32 parts per million of disalicylal diaminopropane, when evaluated in the 3-month storage test, formed only 0.2 mg./100 ml. of sediment.

N-sec-butyl-3-ethoxypropylamine also was evaluated in the 3-month storage test in another uninhibited commercial No. 2 fuel oil. The uninhibited sample of this oil formed 3.1 mg./100 ml. of sediment after 3 months storage. In contrast, a sample containing 60 parts per million of N-sec-butyl-3-ethoxypropylamine and one part per million of disalicylal diaminopropane formed only 0.1 mg./100 ml. of sediment after 3 months storage.

EXAMPLE VIII

N,N-dicyclohexyl-3-methoxypropylamine prepared as described in Example II, also was evaluated in another sample of the commercial No. 2 fuel described in Example VII. The N,N-dicyclohexyl-3-methoxypropylamine was used in a concentration of 23 parts per million together with 2.32 parts per million of disalicylal diaminopropane and this served to reduce the sediment formation from 1.4 to 0.2 mg./100 ml.

EXAMPLE IX

N - sec - octyl - 2 - hydroxyethoxyethylamine also was evaluated in another sample of the No. 2 fuel oil described in Example VIII. A sample of the fuel oil containing 23 parts per million of N - sec - octyl - 2 - hydroxyethoxyethylamine and 2.32 parts per million of disalicylal diaminopropane reduced the sediment formation from 1.4 to 0.3 mg./100 ml. after storage for three months in the manner described above.

EXAMPLE X

One-shot polyether foam is prepared by mixing 50 parts of 3000 molecular weight triol (Wyondotte) with 50 parts of 4000 molecular weight triol. 1.5 parts of L–520 silicon stabilizer (poly-siloxane-poly-oxyalkylene block copolymer described in U.S. Patent 2,834,748) is added together with 0.35 parts of stanous octoate. 0.15 parts of N - sec - butyl - 3 - ethoxypropylamine are used as catalyst, together with 3.5 parts water and 44 parts of toluenediisocyanate (TDI). The foam is cured at 250° F. for one hour.

EXAMPLE XI

N - sec - octyl - 2 - methoxyethylamine is used as a curing agent for an epoxy resin. The epoxy resin is marketed under the trade name of "Epon 828" and is a liquid at room temperature, having a viscosity at 77° F. of 100–160 poises, a maximum Gardner color of 8, and an epoxide equivalent (gram of resin containing one gram equivalent of epoxide) of 175–210 and a weight of 9.7 gallons per pound at 68° F.

The epoxy resin described above is cured by stirring the N - sec - octyl - 2 - methoxyethylamine into the liquid resin. In order to avoid air bubbles in the system, the mixture of resin and curing agent is heated prior to pouring into the mold. The mold is first coated with a conventional release agent to avoid sticking thereto. The mold containing the resin and curing agent is cured in a conventional oven at 212° F. for 6 hours.

EXAMPLE XII

N - sec - octyl - 2 - hydroxymethoxyethylamine is used as a weathering agent for plastic. The plastic is solid polyethylene of the high density type and is marketed commercially under the trade name of "Fortiflex." The polyethylene is milled in a two roll heated mill of conventional commercial design and 0.2% per weight of N - sec - octyl - 2 - hydroxymethoxyethylamine is incorporated in the polyethylene during the milling. The polyethylene then is further processed in conventional manner and will be of improved weathering properties.

I claim as my invention:

1. An N-substituted alkoxyalkylamine of the following formula

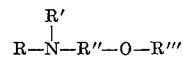

where R''' is alkyl of 1 to 10 carbon atoms or hydroxyalkyl of 1 to 10 carbon atoms, R is sec-alkyl of 3 to 20 carbon atoms or cycloalkyl of 3 to 8 carbon atoms, R' is hydrogen, sec-alkyl of 3 to 20 carbon atoms or cycloalkyl of 3 to 8 carbon atoms when R''' is alkyl of 1 to 10 carbon atoms and R' is sec-alkyl of 3 to 20 carbon atoms or cycloalkyl of 3 to 8 carbon atoms when R''' is hydroxyalkyl of 1 to 10 carbon atoms, and R'' is alkylene of 2 to 10 carbon atoms.

2. The compound of claim 1 being N - sec-alkyl-3-alkoxypropylamine.

3. The compound of claim 2 being N - sec - butyl-3-ethoxypropylamine.

4. The compound of claim 1 being N,N - dicycloalkyl-3-alkoxypropylamine.

5. The compound of claim 4 being N,N - dicyclohexyl-3-methoxypropylamine.

References Cited

UNITED STATES PATENTS 3,364,239  1/1968  Speranza _____ 260—563

ROBERT V. HINES, Primary Examiner

U.S. Cl. X.R.

44—72, 74, 75; 252—454, 458, 459; 260—2.5, 47, 57, 67.6, 70, 77.5, 92.8, 93.5, 93.7, 59, 94, 805, 566, 584